United States Patent
Babaian et al.

(10) Patent No.: US 7,003,650 B2
(45) Date of Patent: Feb. 21, 2006

(54) METHOD FOR PRIORITIZING OPERATIONS WITHIN A PIPELINED MICROPROCESSOR BASED UPON REQUIRED RESULTS

(75) Inventors: Boris A. Babaian, Moscow (RU); Valeri G. Gorokhov, Moscow (RU); Feodor A. Gruzdov, Moscow (RU); Yuli K. Sakhin, Moscow (RU); Vladimir V. Rudometov, Moscow (RU); Valdimir Y. Volkonsky, Moscow (RU)

(73) Assignee: Elbrus International, Moscow (RU)

( * ) Notice: Subject to any disclaimer, the term of this patent is extended or adjusted under 35 U.S.C. 154(b) by 730 days.

(21) Appl. No.: 10/013,425

(22) Filed: Dec. 11, 2001

(65) Prior Publication Data

US 2002/0169944 A1 Nov. 14, 2002

Related U.S. Application Data

(63) Continuation of application No. 09/505,657, filed on Feb. 17, 2000, now abandoned.

(60) Provisional application No. 60/120,352, filed on Feb. 17, 1999, provisional application No. 60/120,461, filed on Feb. 17, 1999, provisional application No. 60/120,464, filed on Feb. 17, 1999, provisional application No. 60/120,528, filed on Feb. 17, 1999, provisional application No. 60/120,530, filed on Feb. 17, 1999, provisional application No. 60/120,533, filed on Feb. 17, 1999, provisional application No. 60/120,450, filed on Feb. 17, 1999, provisional application No. 60/120,361, filed on Feb. 17, 1999, and provisional application No. 60/120,360, filed on Feb. 17, 1999.

(51) Int. Cl.
*G06F 9/30* (2006.01)
*G06F 13/16* (2006.01)
*G06F 13/42* (2006.01)

(52) U.S. Cl. .......... 712/218; 712/215; 712/219; 712/244; 711/169; 713/401; 713/601

(58) Field of Classification Search .......... 712/215, 712/218, 219, 244; 711/169; 713/401, 601
See application file for complete search history.

(56) References Cited

U.S. PATENT DOCUMENTS

| | | | | |
|---|---|---|---|---|
| 4,722,049 A | * | 1/1988 | Lahti | 712/3 |
| 5,257,214 A | * | 10/1993 | Mason et al. | 708/525 |
| 5,907,694 A | * | 5/1999 | Suzuki et al. | 712/210 |

* cited by examiner

*Primary Examiner*—Daniel H. Pan
(74) *Attorney, Agent, or Firm*—Townsend and Townsend And Crew LLP

(57) ABSTRACT

A method and apparatus for solving the output dependence problem in an explicit parallelism architecture microprocessor with consideration for implementation of the precise exception. In case of an output dependence hazard, the issue into bypass of a result of the earlier issued operation having an output hazard is cancelled. Latencies of short instructions are aligned by including additional stages on the way of writing the results into the register file in shorter executive units, which allows to save the issue order while writing the results into the register file. For long and unpredictable latencies of the instructions, writing of the result of the earlier issued operation having an output dependence hazard into the register file is cancelled after checking for no precise exception condition. All additional stages are connected to the bypass not to increase the result access time in case of this result use in the following operations.

7 Claims, 5 Drawing Sheets

METHOD FOR PRIORITIZING OPERATIONS WITHIN A PIPELINED MICROPROCESSOR BASED UPON REQUIRED RESULTS

CROSS-REFERENCES TO RELATED APPLICATIONS

This application is a continuation from U.S. patent application Ser. No. 09/505,657, filed Feb. 17, 2000, now abandoned which claims priority from U.S. Provisional Patent Application Nos. 60/120,352; 60/120,360; 60/120,361; 60/120,450; 60/120,461; 60/120,464; 60/120,528; 60/120,530; and 60/120,533, all of which were filed Feb. 17, 1999, the disclosures of which are incorporated herein by reference in their entirety.

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK.

Not applicable

BACKGROUND OF THE INVENTION

1. Field of the Invention

The present invention is related to an information processing apparatus executing multiple operations concurrently and/or overlapped with static scheduling of the order of operations execution including simultaneous modification of data stored in a multiport register file, if operations are completed in an order different from the one specified in the program.

2. Description of the Prior Art

Pipeline, multi-instruction issue and multi-instruction execution are widely used in the high performance processor design. However, parallel execution in a pipeline of multiple operations on different stages poses a number of problems and requires special measures be taken to save the correct processor condition. One problem is an output dependence or Write After Write (WAW) hazard, which occurs during writing the results of operations with different execution times into a register file.

A WAW hazard occurs when the executive pipeline contains operations with the same write addresses of the results into the register file and different execution time. Under these conditions, it is necessary to ensure the order of writing the results into the register file specified in the program. Actually, such a situation takes place in the programs while switching to a new program branch, which does not take into account the registers use scheduling in the previous branch. Another example is a super optimal scheduling of the operations execution based on the active use of the bypass during the transfer of operations results into the following operations as operands rather than during the transfers through the register file.

One way to resolve the WAW hazard problem is to block the issue of a wide instruction containing the operation bringing about WAW hazard into the executive pipeline, before the execution of the earlier issued operation with the same write address is completed. However, such a solution results in decreasing the processor throughput. In superscalar dynamic architecture use is made of the methods that allow avoiding the throughput losses caused by the WAW hazard.

In the first approach, the architecture registers are dynamically renamed and a new register from the list of free registers is allocated for each new decoded operation. Thus, the conflicts connected with the use of the same write addresses in different operations are avoided.

In the second approach, use of a so-called completion unit ensures writing into the register file in the order of decoding the instructions. In the processor using the completion unit, operations may be executed out of order, but writes into the register file are performed in the issue order.

Both above mentioned approaches require substantial additional hardware and a complex control of the bypass. This complexity is justified for the microprocessors with dynamic scheduling of the instruction issue, but in the microprocessors with static scheduling, the main problems connected with similar conflicts may be resolved in the software, which allows use of more simple hardware ensuring support for the cases when static scheduling appears insufficient.

BRIEF SUMMARY OF THE INVENTION

While the mechanisms resolving output-dependence conflicts for superscalar architecture are sufficiently worked out, there is a need to elaborate a method and hardware for resolving a WAW hazard in the microprocessor with explicit parallelism and static scheduling where using the scheduling results allows more economic hardware decisions to be provided. The present invention is intended to provide the method and hardware for resolving the WAW hazard with a number of advantages as compared to the superscalar architecture.

The present invention relates to a method and apparatus of resolving an output-dependence hazard in an explicit parallelism architecture processor. Instruction of the explicit parallelism architecture processor (wide instruction) contains a number of operations (a simple instruction of add, shift, multiply, divide, load, store and other types), which are executed in parallel. The pipeline of such a microprocessor in the execution phase has multiple parallel threads represented by a plurality of the execution units (adders, shifters, multipliers, dividers, etc.). The executive units have different latencies and write the results of the operations execution into the multiport register file in an order different from the issue order.

When operations with the same destination addresses (addresses of a write result into a register file) are in a pipeline in the execution phase, there arises a problem of ensuring a specified order of writing the results at the same destination addresses. The inventive method and apparatus make it possible to resolve the problem of the output dependence without pipeline blocking and make use of different approaches for short and long threads of the pipeline in the execution phase. All latencies of the short threads of the pipeline are aligned with the longest of the threads by including additional register stages on the way of writing the results into the register file. The results write into the register file for operations having the same destination addresses and issued earlier in the pipeline in the execution phase is cancelled in the long threads of the pipeline. In another aspect of the invention, the additional register stages aligning the short threads of the pipeline are connected to the bypass, which provides a quick access to the operation results before their writing into the register file.

An advantage of the present invention is that resolving of the WAW hazards does not decrease the performance of explicit parallelism architecture processor. Another advantage is the decreased write number to the register file.

DETAILED DESCRIPTION OF THE PREFERRED EMBODIMENT

A. System Architecture Overview

Figure 1:
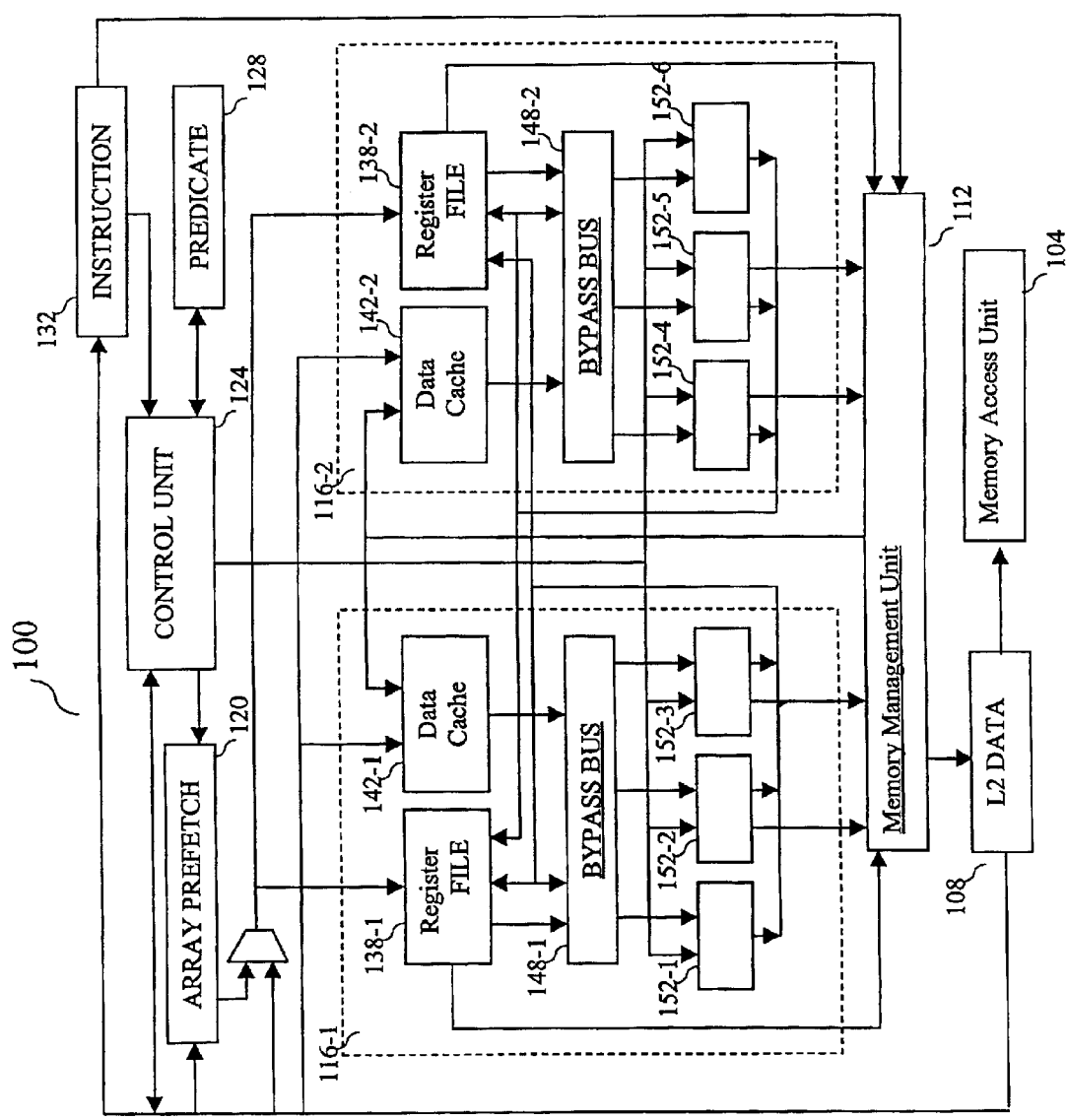
FIG. 1 shows a structure of the explicit parallelism architecture microprocessor.

Referring first to FIG. 1, an overview block diagram of an embodiment of an explicitly parallel instruction computing (EPIC) system 100 is shown. This system or microprocessor 100 employs mechanisms to avoid the code inefficiencies in traditional VLIW machines to increase the number of instructions processed per cycle. To that end, this architecture moves the complex job of instruction scheduling from the microprocessor 100 to the compiler. Included in this embodiment 100 are a memory access unit 104, level two (L2) data cache 108, a memory management unit 112, two processing clusters 116, an array prefetch buffer 120, an instruction control unit 124, a predicate file 128, and an instruction cache 132.

Processing is divided between the two processing clusters 116. Each processing cluster 116 has a general purpose register file 138, a level one (L1) data cache 142, a bypass bus 148, and three arithmetic logic channels (ALCs) 152. The register files 138 and L1 data caches 142 are unified between the clusters 116 to reduce data shuffling, eliminate fragmentation loss, and eliminate memory incoherence.

The memory access unit 104 is an interface for communicating between the microprocessor 100 and external memory at an exchange rate of up to four information words transferred during a cycle. The memory access unit contains an entry buffer for memory requests and a crossbar of four data and one group instruction cache 132 memory access channels to four physical memory channels. The two least significant bits (LSBs) of physical addresses are the physical memory channel number.

To decrease the number of accesses to memory, the L1 and L2 data caches 142, 108 buffer data and the instruction cache 132 buffer instructions. The instruction cache 132 is preferably sixty-four kilobytes (KB) large and has a 4-way configuration, the L1 data cache 142 is eight KB large, and the L2 data cache 108 is preferably two hundred and fifty-six KB large and has a four bank, two-way, configuration. The instruction cache 132 contains wide instruction words in a packed form, which is the same way the wide instructions are stored in memory. Other embodiments could increase cache 108, 132, 142 sizes and/or configurations, if sufficient die area is available.

The memory management unit (MMU) 112 contains a four-port data translate lookaside Buffer (DTLB) with sixty-four entries and performs a hardware search in the page table of DTLB in case of a cache miss. The MMU 112 also contains disambiguation memory for checking rearrangement correctness of load and store operations, performed by an optimizing compiler.

The array prefetch buffer (APB) 120 is used to prefetch for loops from memory array elements. The APB 120 includes a four-channel first-in first-out (FIFO) buffer and contains forty-eight registers in each channel. The registers are at least sixty-four bits wide. Data is transferred from the APB 120 to the general-purpose register files 138 when the data is ready.

The instruction control unit 124 generates wide instruction words in an unpacked form, transforms indirect based operands addresses of wide instruction words to absolute addresses in a register file 138, checks the conditions of the wide instruction word, and distributes the wide instruction word to the arithmetic logic channels 152. The instruction control unit 124 also checks instruction issue conditions, such as no exception conditions, no interlock conditions between other arithmetic logic channels 152, and availability of operands in the register file 138.

The predicate file 128 stores predicate values generated by integer and floating point compare operations. Predicate values are used to control the conditional execution of operations and are used to move branch conditions to the end of software loops. Included in the predicate file 128 are thirty-two predicate registers, each two bits wide. One bit in each predicate register holds the predicate value and the other bit holds an inverse of the predicate value.

There are two general-purpose register files 138, one register file 138 for each processing cluster 116. There are two hundred and fifty-six registers in the register file 138 and each register is sixty-four bits wide. Both floating point and integer operations use the same register file 138 and ports to that register file 138. Each copy of the register file 138 has ten physical read and ten physical write ports for a total of twenty logical read and ten logical write ports. Data are written to both register files 138 and the L1 data caches 142 to ensure memory coherency.

The register file 138 has a pipelined design and uses the same data lines for read and write with a half clock shift. Less than two clock cycles are allocated in the microprocessor pipeline for accessing the data in the register file 138. The large size of the register file 138 in this embodiment provides fast code execution, because the register file 138 holds an increased number of intermediate results and local variables from the running code. This size of the register file 138 substantially decreases the number of memory accesses.

Procedure calls and program boundaries require considerable time to save and restore a large number of registers. For this reason, the microprocessor 100 supports a variable size register window mechanism with a current procedure register base that points to the beginning of the current procedure area in the register file 138 or predicate file 128. A real physical register address is calculated by adding an increment value from the register address in the instruction to the value of the procedure base. On a procedure call or program boundary, the window is advanced by adding to the procedure register base.

There are six ALCs 152 in the microprocessor 100 arranged with three ALCs 152 in each processing cluster 116. The ALCs 152 work in parallel and have nearly the same sets of arithmetic and logic operations. Table I shows the allocation of the operations between the ALCs 152. All ALCs 152 receive operands from the register file 138 and bypass buses 148. The bypass busses 148 relieve bus conflicts when delivering the operators for some operations.

TABLE I

| Operation | ALC Number | | | | | |
|---|---|---|---|---|---|---|
|  | 1 | 2 | 3 | 4 | 5 | 6 |
| Integer ALC | x | x | x | x | x | x |
| Integer Combined |  | x |  |  | x |  |
| Load/Store L1 | x |  | x | x |  | x |
| Load/Store L2 | x |  | x | x |  | x |
| Floating Point Add (32/64 bit) | x | x |  | x | x |  |
| Floating Point Add (80 bit) | x | x |  | x | x |  |
| Multiply (32/64 bit) | x | x |  | x | x |  |
| Floating Point Multiply (80 bit) | x | x |  | x | x |  |
| Floating Point Multiply-Add (32/64 bit) | x | x |  | x | x |  |
| Divide (32 bit) |  |  |  |  |  | x |
| Divide (64 bit) |  |  |  |  |  | x |
| Floating Point Division (32/64 bit) |  |  |  |  |  | x |
| Multimedia Extension Multiply/Shift |  | x |  |  | x |  |
| Multimedia Extension Add/Subtract | x |  |  | x |  |  |

Figure 2:
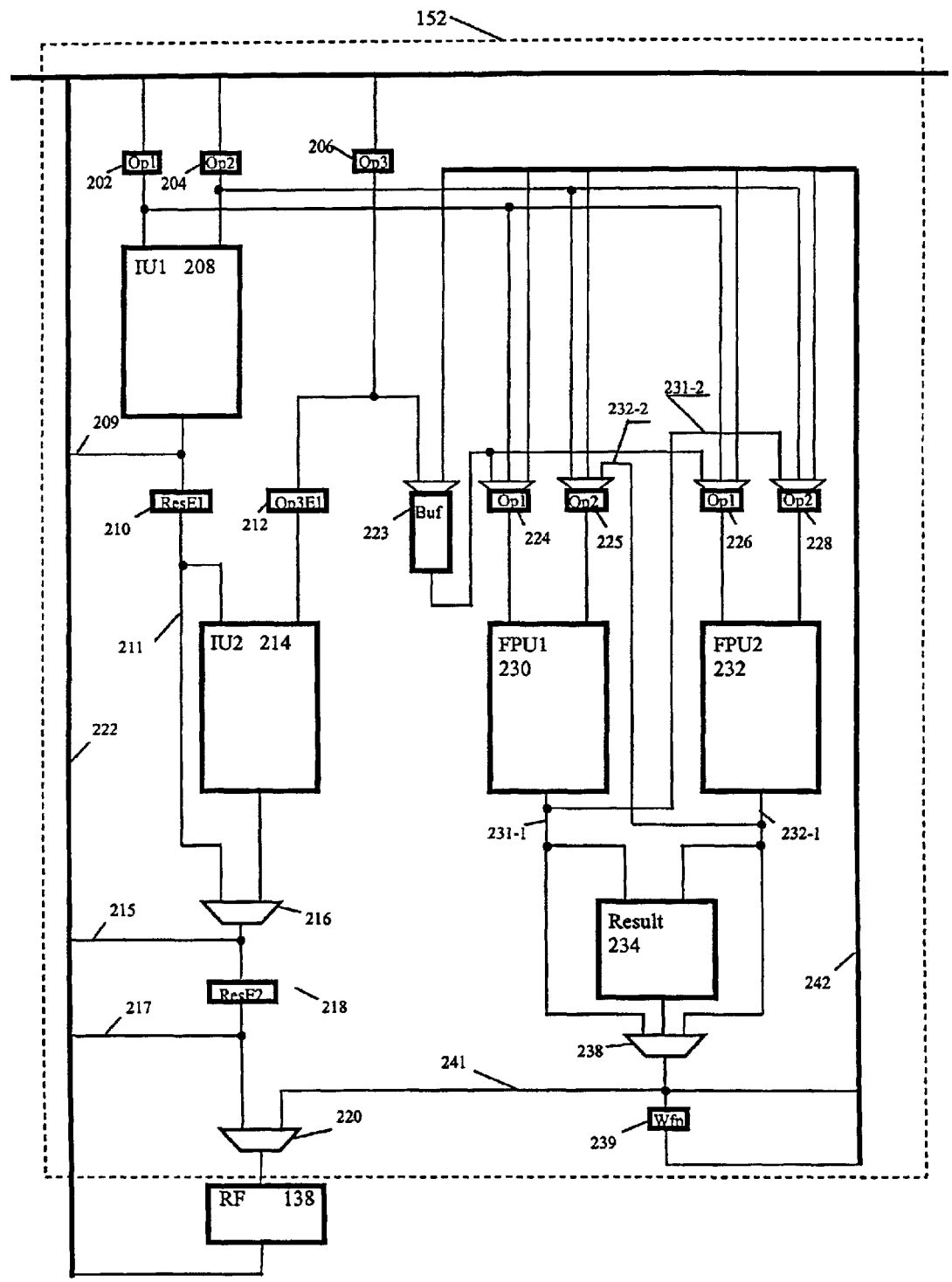
FIG. 2 shows a typical data path of Arithmetic-Logic Channel.

FIG. 2 shows a diagram of an embodiment of a wide instruction word 200 having a number of syllable types. The microprocessor 100 uses a variable length wide instruction word 200 having from two to sixteen syllables. Each syllable is thirty-two bits long. The first syllable is a header 204 that specifies the number and type of syllables in the wide instruction word 200.

The syllables after the header 204 hold instructions that fall into a number of categories. Table II describes various categories of instructions possible in the instruction word 200. This table also lists a maximum number of instructions possible in each category. Although this embodiment has a maximum of sixteen syllables, other embodiments could have a different amount, for example, thirty-two syllables.

TABLE II

| Syllable Type | Explanation | Max. Number |
|---|---|---|
| Header | Word Length and Structure | 1 |
| ALC | Execution Channel Function(s) | 6 |
| Control | Prepare to Branch Control | 3 |
| AAL | Additional ALC Function for Chained Operations | 2 |
| Move | Move Data from Prefetch Buffer to Register | 4 |
| Literal | Supply Literal to ALC | 4 |
| Predicate | Predicate Logic Calculations | 3 |
| Conditions | Predicate and ALC Masks | 3 |

In each cycle, the microprocessor control unit issues a wide instruction containing 6 operations for 6 ALCs. In each cycle, 6 ALCs write the results of the operations execution into the register file out of order.

For convenience, further in the text it will be stated that the operation brings about a WAW hazard in case it is issued in the executive pipeline and its result address to the register file coincides with the result address of the operation issued in the executive pipeline earlier. It will be stated that the operation has a WAW hazard, if its result address coincides with the result address of the operation issued in the executive pipeline.

A method of resolving output dependence problem that does not cause the performance decrease is cancellation of writing into the register file the results of operations with the same result addresses available in the executive pipeline except for the operation, which was last issued into the executive pipeline. For the explicit parallelism architecture microprocessor having a set of different latency parallel threads in the executive pipeline, the problem takes on additional quantitative complexity, because the possibility of cancellation of the result writing should be checked in parallel in all threads of the executive pipeline and for all operations issued in the executive pipeline. Thus, the WAW hazard can be discovered concurrently in a number of threads of the executive pipeline.

However, as compared with the superscalar architecture this problem is less complex, since there are no input instructions queues and only threads of the executive pipeline are subject to checking.

The following restrictions should be noted:

a) writing of the result of the operation with a WAW hazard should not be cancelled, if precise exception occurs in any of the operations issued in the executive pipeline prior to the operation, which gave rise to the WAW hazard;

Failure to meet this requirement causes the result of the operation with the WAW hazard to not be written into the register file.

b) the executive pipeline structure of the up-to-date microprocessor has a bypass that provides for a possibility to use the results of the operations in the following operations as operands before these operations are actually written into the register file. In this connection with the occurrence of the WAW hazard, it is necessary to inhibit the use of the result of the operation having the WAW hazard from the bypass.

Taking these restrictions into account, the present invention provides the following solution of the output dependence problem.

To the precise exception type refer the interruptions in integer operations and interruptions connected with the source operands in floating point operations. Checking for precise exception availability is performed during the first 2 cycles of the executive pipeline operation. For precise exception to be implemented, it is required to cancel writing of the result of the operation having the WAW hazard only after checking that there is no precise exception in the operation that has given rise to the WAW hazard, i.e. not just before the next set of operations are issued in the pipeline, but 2–3 clock later.

In such conditions, taking into account that the execution time of integer operations is equal to 1–2 clocks, the time of these operations execution can be aligned to the longest one, which will make the order of the integer operation result write compliant with the instruction issue order, and thus, eliminate the WAW hazard. In this case, to avoid the decrease of the access time to the operations results for using them in the following operations as operands, it is necessary to connect to the bypass additional pipeline stages used to align the short threads of the pipeline. Thus, the artificial increase of the result write time of some threads of the executive pipeline will not affect the microprocessor throughput.

Floating-point operations generally have a longer execution time, over 2–3 clocks, and what is most important, it cannot be statically specified and is dependent on the source operands. Load operations also have an indefinite execution time dependent on allocation of the loaded values (L1 cache, L2 cache or main memory). For such operations having the WAW hazard, the method of cancellation of the result write into the register file is applicable. The operation that has given rise to the WAW hazard, after passing the pipeline stages, which guarantee that there is no precise exception in this operation and all other operations arrived at the executive pipeline in the same wide instruction, ensures cancellation of writing the results of the operation having the WAW hazard.

Availability of the bypass in the microprocessor structure requires a special solution for inhibition of the use through the bypass of the ready results of operations in the following operations in case of the WAW hazard.

In general, use of the results of operations in the following operations gives rise to data dependence, which is called Read After Write (RAW) hazard. In the explicit parallelism architecture microprocessor checking for the RAW hazard is performed before a wide instruction comes to the executive pipeline, and if the result of the preceding operation is not ready (no result in the register file and bypass) the issue of the next wide instruction in the executive pipeline is blocked.

With the WAW hazard available, the executive pipeline contains more than one operation with the same write addresses of the results into the register file, and the ready results of these operations can be accessible through the bypass for the following instructions causing RAW hazard, which give rise to uncertainty. To eliminate this uncertainty, while issuing into the executive pipeline the operation that has given rise to the WAW hazard, it is necessary to inhibit the use through the bypass of the ready results of the earlier issued operations having the WAW hazard.

FIG. 2 shows a data path structure of a typical (one out of six) Arithmetic Logical Channel ALC 152 containing short (Integer Units) and long latency (Floating Point Units) parallel threads of the executive pipeline. FIG. 2 also shows the aligning of the short latency threads of the executive pipeline. The short executive pipeline comprises E0, E1 and E2 phases, during which checking for possible precise exceptions is performed and operation results are generated.

Input registers Op1 202 and Op2 204, Integer Unit IU1 208, output register ResE1 210 form the first short 1-clock latency thread. This thread executes 2-operands integer operations (add, shift, logical and etc).

Input registers Op1 202, Op2 204 and Op3 206, Integer Unit IU1 208, output register ResE1 210, buffer register Op3E1 212, Integer Unit IU1 214, multiplexor 216, output register ResE2 218 form the second short 2-clock latency thread. This thread executes combined 3-operands operations (add-add, add-shift, shift add, add-logical, logical-add and etc.). IU1 208 executes the first operation and IU2 214 executes the second operation of the combined operation.

Latency of the first short thread is specially increased by 1 clock by including an additional register stage on the way of the result write into the register file 138. To this end, the output register ResE1 210 by the line 211 is connected through the multiplexor 216 with the output register ResE2 218. Thus, both short threads have an equal latency of 2 clocks.

This is how the short threads of Arithmetic Logical Channels ALC2 152-2 and ALC5 152-5 capable of executing both simple 2-operands integer operations and combined 3-operands integer operations in accordance with the Table 1 are arranged. Arithmetic Logical Channels ALC1 152-1, ALC3 152-3, ALC4 152-4 and ALC6 152-6 execute only simple 2-operands integer operations. That is why these channels have only short 1-clock latency threads, but their latency is also increased up to 2 clocks by simple adding the register stage ResE2 218 without IU2 214.

Thus, the short latency threads of all 6 Arithmetic Logical Channels ALC 152 have the same latency, which ensures a sequential execution of all coming integer operations and eliminates the rise of the WAW hazard.

The result outputs of all stages of the short threads (lines 209, 215, 217) are connected to the integer bypass 222. This allows for quick access to the results of the integer operations before they are written into the register file 138.

FIG. 2 also shows two long threads of one ALC 152. Both long threads have input common registers Op1 202, Op2 204 and Op3 206; input floating point registers Op1 224 and Op2 225 of the first long thread; input floating point registers Op1 226 and Op2 228 of the second long thread; Floating Point Units FPU1 230 (for add type operations) and FPU2 232 (for multiply type of operations); Result Buffer 234; output multiplexor 238. Floating Point Units 230 and 232 can execute combined floating point operations of add-multiply and multiply-add types. To make this possible the output of FPU1 230 through the line 231-2 is connected with the input register Op2 228 of FPU2 232 and output of FPU2 232 through the line 232-2 is connected with the input register Op2 225 of FPU1 231. The third operand of the combined operation is delayed in Buf 223 for the time of the first operation execution and then comes to the input registers Op1 224 or Op1 226 for the execution of the second operation.

Latency of FPU1 230 and FPU2 232 depends on the type of the executed operation and operand values. Short and long latency threads have a common bus write the result into the register file 138. Because of this, in the multiplexor 220 a conflict may occur regarding the use of this bus between the short and long latency threads, as well as between both latency threads. Short latency threads have a higher priority, that is why long latency threads contain the Result Buffer 234.

The result output of the long threads (line 241) is connected to the floating point bypass 242, which allows to quickly access the results of the floating point operations before they are written into the register file 138.

Figure 3:
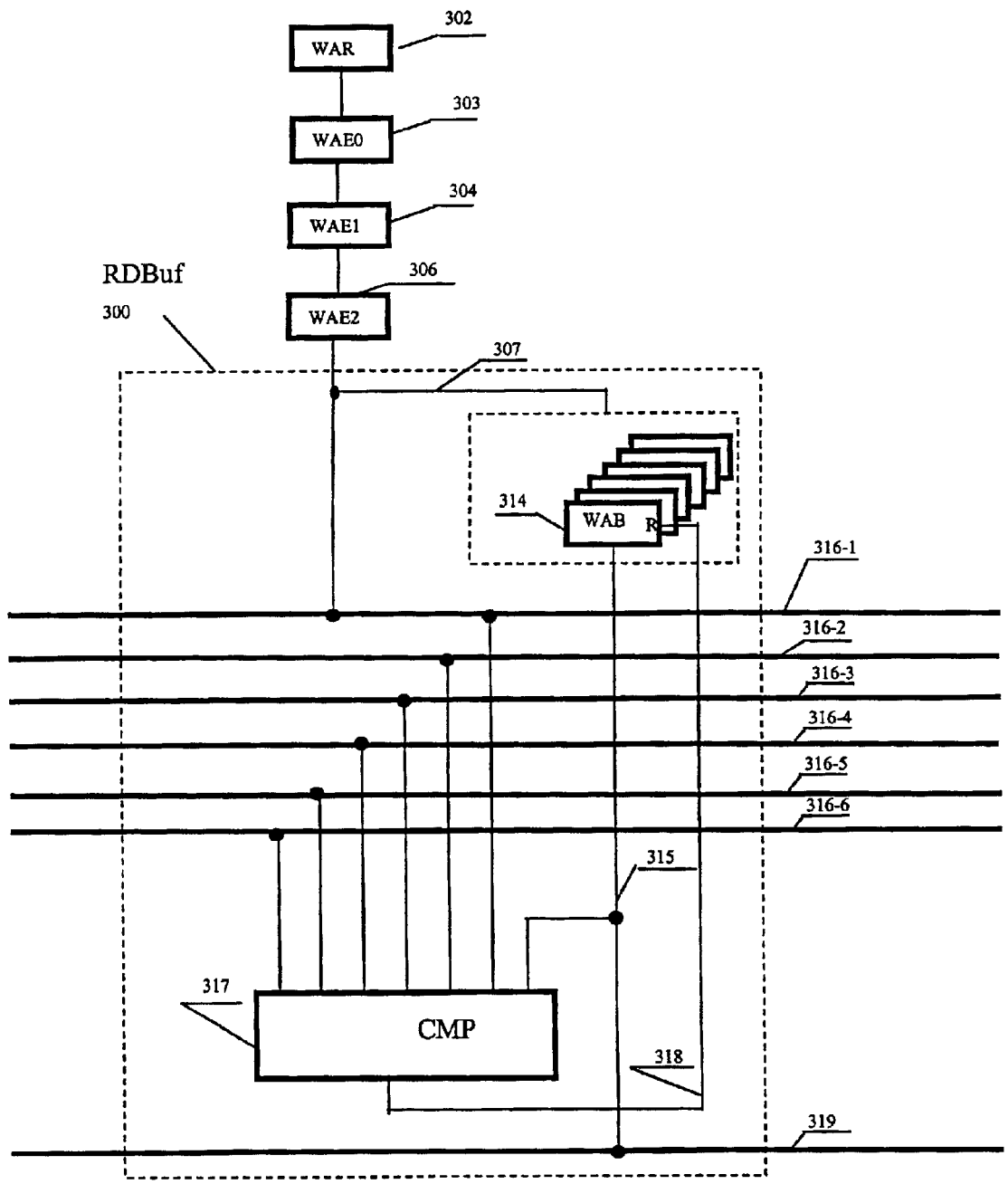
FIG. 3 shows a structure of an address result path of Arithmetic-Logic Channel.

FIG. 3 shows a structure of the address result path and apparatus for cancellation of write 300 into the register file 138 for a long latency thread with the WAW hazard for a typical (one out of six) Arithmetic Logical Channel ALC 152.

The result address path contains the result address register stages R (WAR 302), E0 (WAE0 303), E1 (WAE1 304), E2 (WAE2 306) and 6 floating point buffer address registers WAB 314. Cancellation is performed when the next wide instruction arrives at E2 stage, i.e. when checking for the precise exception absence in the next wide instruction is completed. At this moment, the result address registers of stage E2 (WAE2 306) from all 6 ALCs 152 (lines 316-1, 316-2, 316-3, 316-4, 316-5, 316-6) are compared with 6 floating point buffer address registers WAB 314 for each channel ALC 152 using the comparator CMP 317, and a reset of a validate bit of the compared floating point buffer address register WAW 314 is performed, which ensures inhibition of the write into the register file, when a corresponding operation in the given ALC is finished.

Figure 4:
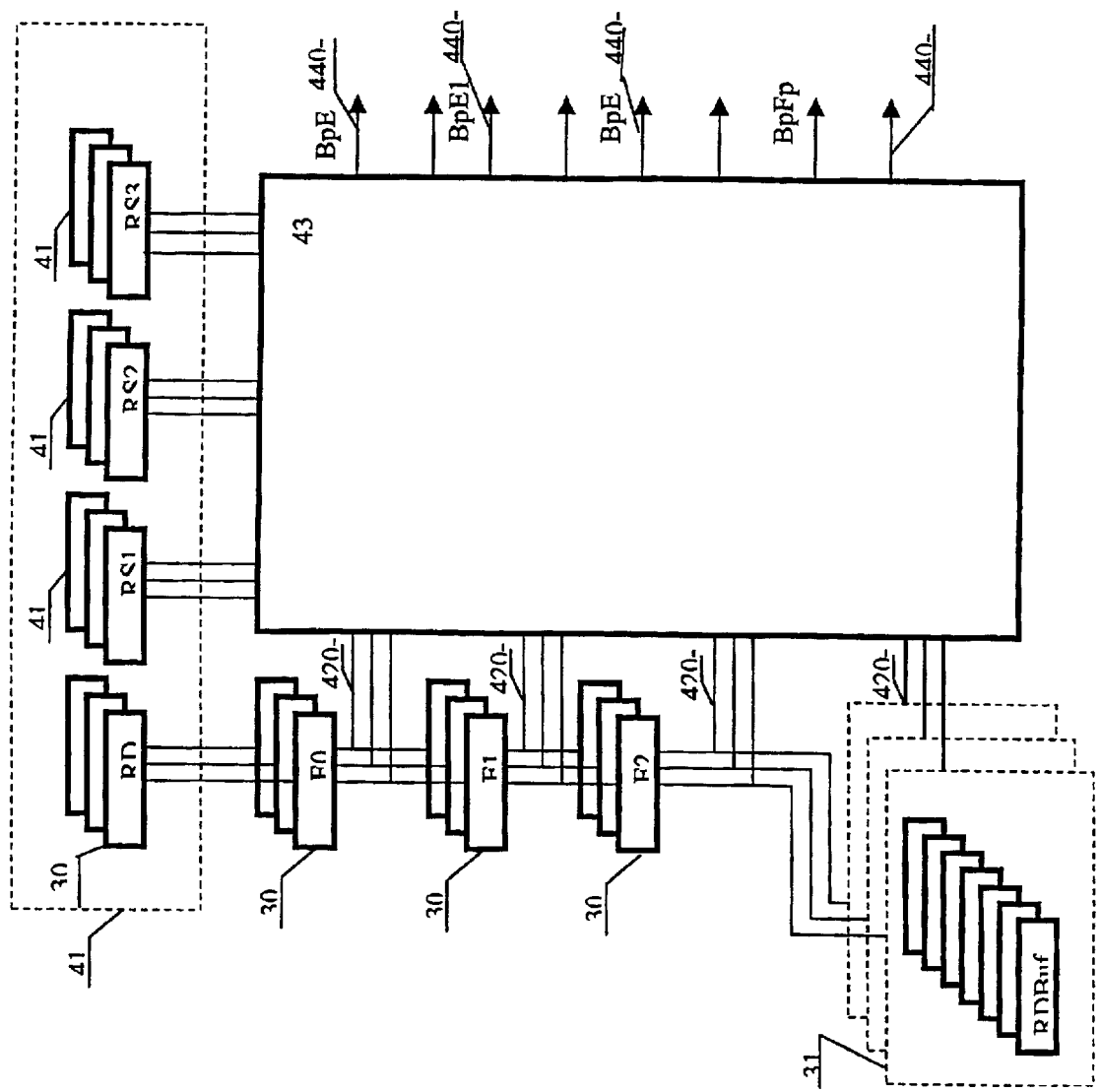
FIG. 4 shows a bypass control unit of a cluster.

FIG. 4 shows the control unit 400 of the bypass of one cluster 148. Checking for the availability of the operations' results ready to be used as operands in the current wide instruction is performed on the R stage (in parallel with the operands read from the register file 138). At this moment integer address registers of the source operands RS1 414, RS2 416 and RS3 418 of all 3 ALC 152 of the cluster 148 with the ready results address registers of stages E0 303, E1 304, E2 306 (for a short latency pipeline) and address result buffers WAB 314 (for a long latency pipeline). In case of a coincidence Comparator 430 generates control signals BpF0 440-1, BpE1 440-2, BpE2 440-3 to receive the results in the corresponding common input operand registers 202, 204 and 206 and control signals BpFp 440-4 to receive the results in the floating point input operand registers 224, 225, 226, 228.

The necessity of the inhibition to use, through the bypass, the results of the operations having a WAW hazard require to introduce additional comparators into the bypass control unit to compare the write addresses of the results of the operations coming and already available in the pipeline. Stage E0 303 is compared with stages E1 304, E2 306 and RDBufs 314 to check for the availability of the operation giving birth to the WAW hazard in stage E0 303. Stage E1 304 is compared with stages E2 306 and RDBufs 314 to check for the availability of the operation giving birth to the WAW hazard in E1 304. Stage E2 304 is compared with stage RDBufs 314 to check for the availability of the operation giving birth to the WAW hazard in stage E2 306. In this case the inhibition should be effective only at the moment of comparing, when different stages of the pipeline contain operations with the same result write addresses. It is necessary to ensure the inhibition, but not the reset of the validate bit of the address, because the operation that has given rise to the WAW hazard can be cancelled itself in the process of checking for precise exception, and such inhibition must be cancelled as well.

Figure 5:
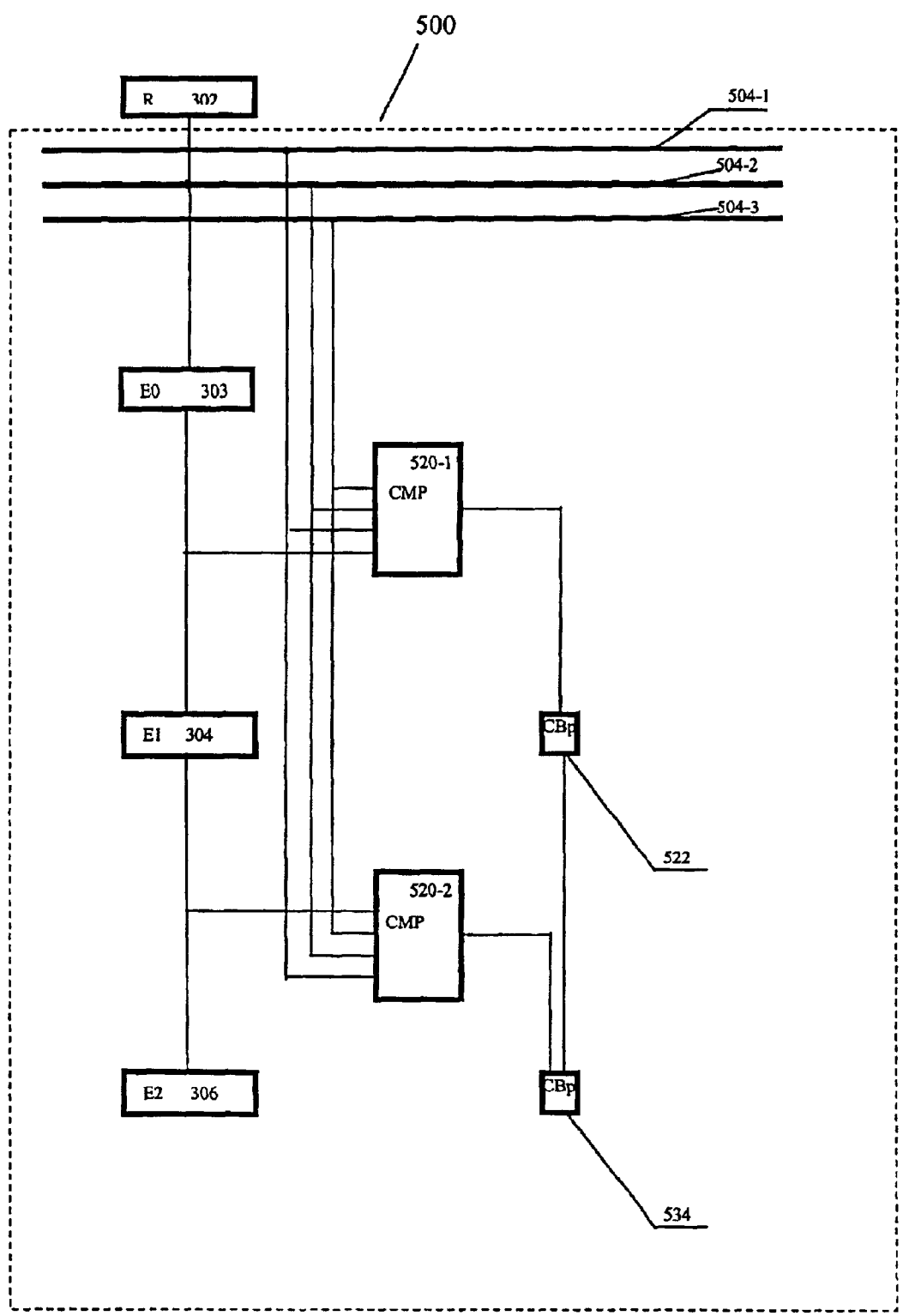
FIG. 5 shows a unit of inhibition of using the operations results through the bypass.

FIG. 5 shows an alternative efficient inhibition method for using the operations results through the bypass by the example of one channel ALC 152. According to this embodiment, the result address registers 302 in R stage via lines 504-1, 504-2 and 504-3 of all 3 ALC 152 of the cluster 148 are compared with the result address registers of stages E0 303 and E1 304, i.e. one clock earlier than required. Comparators CMP 520-1 and CMP 520-2 transfer the comparison results to the following stages CBp 522 and CBp 534 to form inhibition for using the bypass in these stages. Inhibition for using a floating point bypass is performed by setting up a higher priority of using E0, E1 and E2 stages. That is, if there is a comparison of the operands addresses of the current wide instruction with the result addresses of E0, E1 and E2 stages, then the use of the floating-point bypass is inhibited.

What is claimed is:

1. A method of resolving an output dependence problem with regard to the requirement to ensure a precise exception in an explicit parallelism architecture processor comprising a set of different latency executive units, a register file with a set of write ports to write the results of the operations execution and a bypass to transfer the results of the operations execution to the following operations as operands before the real write into the register file, the method comprising:
   ensuring a correct write order of the operations results into the register file with a WAW hazard available by:
   aligning the execution time of a set of short latency instructions to the longest latency from the set and writing their results into the register file only after checking for the absence of precise exception, which restores the issue order of results write into the register file of said instructions and makes it possible to implement precise exception for this type of instructions;
   canceling the write into the register file for long and undefined latency type operations, which are already being executed in the executive units, and which addresses of the result write into the register file coincide with the write addresses of operations coming to the executive units, in this case the write inhibition is performed only after checking for the absence of precise exception in the operations coming to the executive units is finished;
   ensuring a correct use through the bypass of the results of operations in the following operations as operands with the WAW hazard available by:
   inhibiting the issue through the bypass of the results of all operations, which are already being executed in the executive units, which write addresses into the register file coincide with the write addresses of operations coming to the executive units, in this case the inhibition is performed as soon as the operations with the same result addresses come to the executive units;
   ensuring access through the bypass to the results of the short latency operations in all additional stages introduced to align the execution time.

2. The method of claim 1, where a set of short latency operations comprises integer, combined integer and multimedia operations.

3. The method of claim 1, where a group of long and undefined latency operations comprises fpa, combined fpa, multiply and division operations.

4. An explicit parallelism architecture processor comprising a set of different latency executive units, a register file with a set of write ports to write the operation execution results and a bypass to transfer the operation execution results to the following operations as operands before they are actually written into the register file, wherein:
   a set of short latency executive units has equal latencies due to the introduction of additional stages in the shortest ones, which ensures the issue order of the operation execution results;
   a set of long and undefined latency executive units has a means for canceling the result write into the register file for operations having a WAW hazard and issued first for execution, in this case the write inhibition is performed after the operations coming for execution are checked for the absence of precise exception, wherein the means for canceling the result write into the register file for operations having a WAW hazard and issued first for execution comprises:
   an address result path of executive pipeline, comprising the write addresses into the register file of all operations contained in the execution units;
   comparators of the register file write addresses of the first stage after checking for precise exception absence of all executive units with write addresses of all the following stages of all executive units; and
   a reset circuit of a validate bit of the write address into the register file by the comparison results obtained by said comparators;
   a bypass control unit comprises a means for inhibiting the issue into the bypass of the results of operations having the WAW hazard and issued first for execution; and
   stages of the short latency executive units added for latency aligning are connected to the bypass, which maintains a fast access to the results of the instructions before they are written into the register file.

5. The explicit parallelism architecture processor of claim 4, wherein a means for inhibiting the result issue into the bypass for operations having a WAW hazard and issued first for execution comprises:
   an address result path of the executive pipeline, comprising write addresses into the register file of all operations available in the executive units;
   comparators of operand addresses of all operations issued into the executive units with all write addresses into the register file of all stages of the execution units, used to control the results issue into the bypass;
   comparators of register file write addresses of all stages of the executive units and write addresses of all the following stages, used to inhibit the issue of the results into the bypass.

6. An explicit parallelism architecture processor comprising a set of different latency executive units, a register file with a set of write ports to write the operation execution results and a bypass to transfer the operation execution results to the following operations as operands before they are actually written into the register file, wherein:

a set of short latency executive units has equal latencies due to the introduction of additional stages in the shortest ones, which ensures the issue order of the operation execution results;

a set of long and undefined latency executive units has a means for canceling the result write into the register file for operations having a WAW hazard and issued first for execution, in this case the write inhibition is performed after the operations coming for execution are checked for the absence of precise exception;

a bypass control unit comprises a means for inhibiting the issue into the bypass of the results of operations having the WAW hazard and issued first for execution, wherein the means for inhibiting the result issue into the bypass for operations having a WAW hazard and issued first for execution comprises:

an address result path of the executive pipeline, comprising write addresses into the register file of all operations available in the executive units;

comparators of operand addresses of all operations issued into the executive units with all write addresses into the register file of all stages of the execution units, used to control the results issue into the bypass; and comparators of register file write addresses of all stages of the executive units and write addresses of all the following stages, used to inhibit the issue of the results into the bypass; and stages of the short latency executive units added for latency aligning are connected to the bypass, which maintains a fast access to the results of the instructions before they are written into the register file.

7. The explicit parallelism architecture processor of claim 6, wherein the means for inhibiting the results issue into the bypass for the operations having a WAW hazard and issued first for execution, comprises:

comparators of register file write addresses of all operations, issued in the executive units, with the write addresses of all stages of the executive units, except for the first one.

* * * * *